Sept. 29, 1953 R. B. PRESSLER 2,653,476
AUTOMATIC METER COMPENSATING MECHANISM
Filed June 11, 1949 3 Sheets-Sheet 1

RALPH B. PRESSLER
INVENTOR.

BY Edmund W. C. Kamm
ATTORNEY

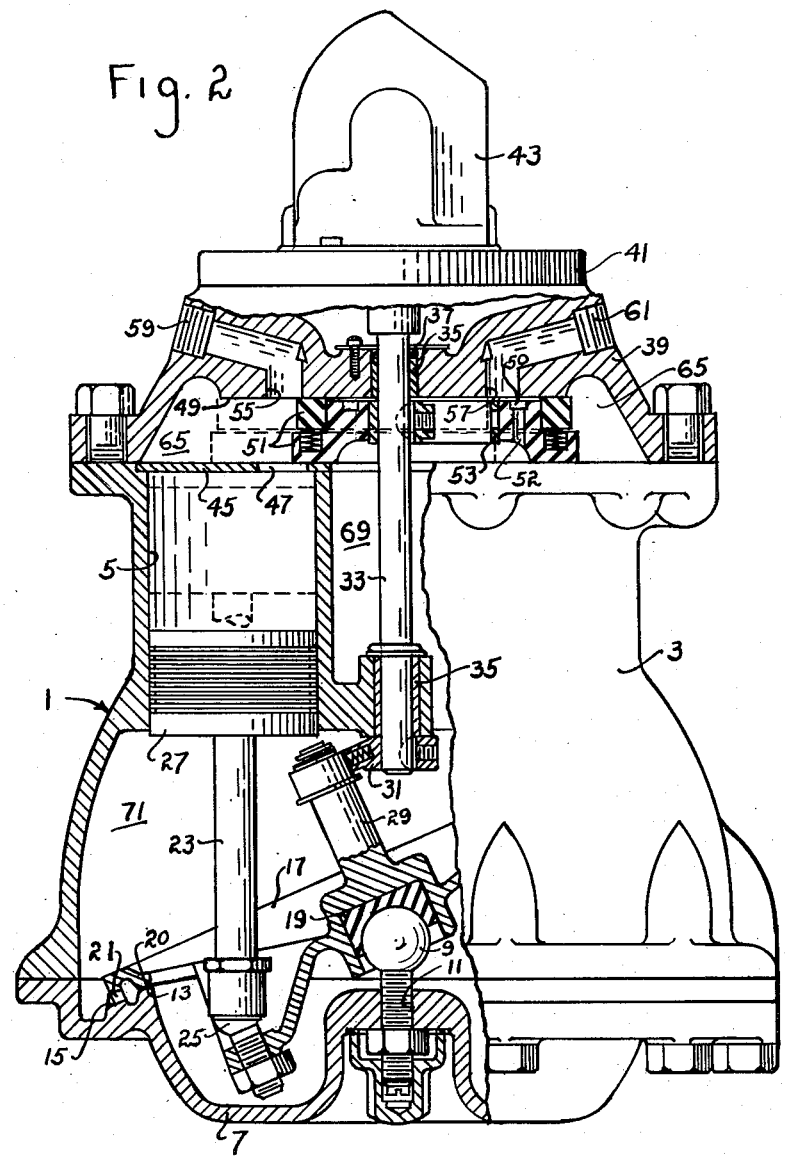

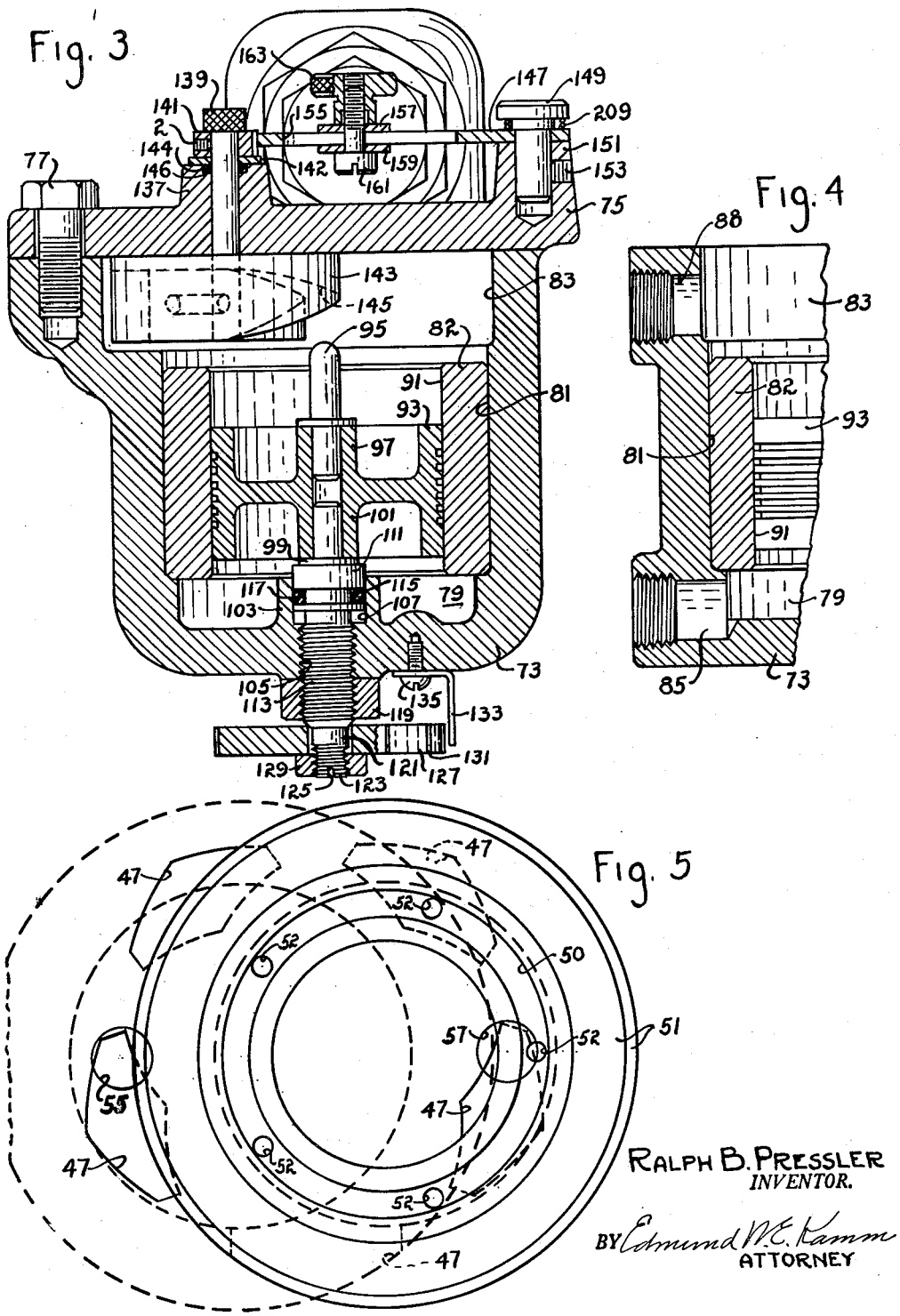

Patented Sept. 29, 1953

2,653,476

UNITED STATES PATENT OFFICE 2,653,476

AUTOMATIC METER COMPENSATING MECHANISM

Ralph B. Pressler, Fort Wayne, Ind., assignor to Bowser, Inc., Fort Wayne, Ind.

Application June 11, 1949, Serial No. 98,472

4 Claims. (Cl. 73—244)

This invention relates to a meter compensating mechanism. More specifically it relates to means for adding a greater or lesser quantity of liquid to that displaced by a meter so as to compensate for such factors as variation in temperature, coefficient of expansion, specific gravity, or, if desired for inaccuracies in meter calibration.

It is a well known fact in the art of measuring liquids by means of meters, that the American Petroleum Institute has established a standard gallon for petroleum products, which is defined at 231 cubic inches at 60 degrees Fahrenheit. Thus the volume of liquid displaced by any metering system should, at 60 degrees Fahrenheit, agree with the volume indicated by the register driven by the meter in such system.

Obviously if the metering is performed at a temperature above 60 degrees F., more than a gallon will have to be dispensed by the meter for each gallon registered so that when the liquid is reduced to 60 degrees F., the volume will actually be one gallon. Conversely, if the metering is performed at a temperature below 60 degrees F., less than a gallon should be displaced by the meter for each gallon registered so that when the liquid temperature is raised to 60 degrees F., it will occupy a volume of one gallon.

It is also a well known fact that various liquids expand and contract by differing amounts for the same temperature change. The amount of change is expressed in terms of coefficient of cubic expansion or, alternatively and approximately, in degrees of specific gravity as established by the American Petroleum Institute. Both temperature and cubic expansion coefficient must be considered if accuracy is required.

It is, therefore, an object of this invention to produce a mechanism which will compensate for both temperature and coefficient of expansion of the liquid being measured.

A further object is to provide a metering mechanism which will fully compensate for the expanded or contracted condition of the liquid being measured so that when the liquid dispensed is reduced to standard temperature, the volume occupied by it will agree with the register driven by the meter.

Another object of the invention is to provide means for compensating for the expanded or contracted condition of a liquid being metered by operating the meter at a displacement which is less than that required for a standard gallon as indicated by the register, and adding a measured amount of liquid to that displaced by the meter to complete the standard gallon.

Yet another object is to add compensating quantities of liquid to the liquid displaced by the meter, to produce the standard volume indicated on the register.

A further object of the invention is to add controlled amounts of liquid to that displaced by a meter to produce the standard volume indicated on the register.

Still another object of the invention is to add compensating quantities of liquid to that displaced by a meter to produce the standard volume, the quantities added being regulated by the temperature and/or the coefficient of expansion of the liquid being metered.

Yet another object of the invention is to provide means for adding compensating quantities of liquid to the liquid discharged by the meter at regular intervals.

These and other objects will become apparent from a study of the specification and the drawings which are attached hereto and made a part hereof and in which:

Figure 2 is a side elevation, partly in section, of the meter, showing the valve, displacement mechanism and the ports for both the displacement mechanism and the compensator.

Figure 3 is a vertical section taken substantially on line 3—3 of Figure 1 of the drawing showing the compensator mechanism.

Figure 4 is a partial vertical section of the compensator mechanism taken substantially on the line 4—4 of Figure 1 and showing the porting of the mechanism.

Figure 5 is a diagrammatic plan view showing the relative relations of the displacement meter and compensator valve ports and valve.

Meter structure

Figures 1, 6:
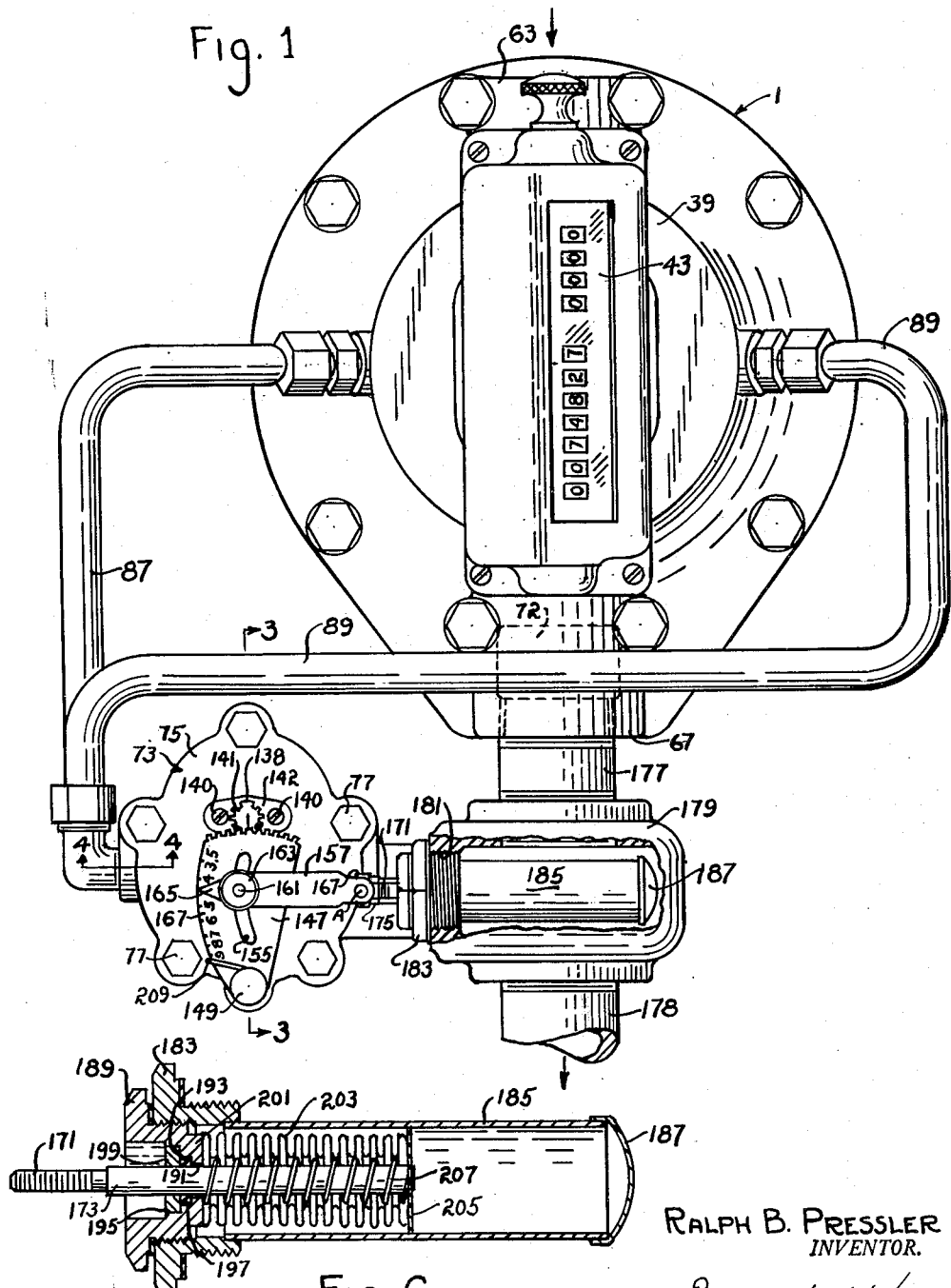
Figure 1 is a plan view of the meter, compensator and controls therefore with parts broken away to show the thermostat.
Figure 6 is a sectional view of the thermostat mechanism.

Referring to the drawings, the numeral 1 represents a displacement meter of any suitable type. The particular meter disclosed herein includes a body 3 having a plurality of cylinders 5, a bottom head 7 having a journal 9 mounted for vertical adjustment in a threaded opening 11 in the head. A track 13 and a gear 15 are formed in the head.

A control plate 17 has a central bearing 19 mounted on the journal, a peripheral track 20 running on track 13 and a peripheral gear 21 meshing with gear 15.

Piston rods 23 are mounted on ball joints 25 on the plate and carry trunk type pistons 27 which ride in cylinders 5.

The control plate has a central shaft 29 which is perpendicular to the plane of its track and which is spanned by the arms of a crank 31 fixed to a shaft 33. The shaft is mounted for rotation on bearings 35 in body 3 and head 39, and extends through a seal 37 in the upper head 39, through the cap 41 and into the register 43 which it drives.

A port plate 45 having a port 47 for each cylinder is mounted on the top of the body. A boss on the upper head is faced at 49 parallel to the plate, and a valve 51 comprising two telescoping rings bears on the plate and face.

An eccentric 53 is mounted on shaft 33 and the valve is given an orbital motion as shaft 33 revolves.

The structure thus far described forms the subject matter of my application, Serial No. 580,985, for Liquid Meter, filed March 5, 1945, and which matured into Patent Number 2,625,914 on January 20, 1953.

Two additional ports 55 and 57 are formed in the face 49 of the upper head and terminate in passages 59, 61 respectively which open to the exterior of the head. The ports are so disposed that they will alternately communicate with the interior and exterior of the valve.

An annular groove 50 is cut in the top of the inner valve ring near the inner flange and a number of vertical holes 52 are formed through the flange to provide adequate passage for liquid to the ports 55 and 57.

The inlet 63 is connected to a suitable source of liquid and communicates with the channel 65 which is on the outside of the valve 51. The outlet 67 communicates with the interior of the valve 51 through the space 69 between the shaft 33 and the cylinders 5, the space 71 above the control plate and up through a passage 72 shown in dotted lines in Figure 1.

It will be seen from Figure 5 that the valve, as it rotates in its orbital path, successively opens the ports 47 to the inlet passage 65 and thereafter closes them and reopens them to the discharge passage 69. The valve sealingly engages the port plate 45 and face 49.

Similarly the ports 55 and 57 are alternately connected to the inlet and discharge chambers.

*Compensator structure*

A bowl or container 73 is fitted with a cover 75 which is sealingly fixed thereto by screws 77. The bowl has a lower clearance chamber 79 and is bored at 81 to receive a cylinder sleeve 82 and is counterbored at 83. The chamber 79 is provided with passage 85 which is connected by pipe 87 to channel 59 and port 51. The counterbore 83 has a passage 88 which is connected by pipe 89 to channel 61 and port 53.

The sleeve 82 is press fitted into the bore 81 and is provided with a bore 91 in which a free piston 93 is slidably mounted. A cam follower 95 is mounted in the upper end 97 of the piston hub, while a hardened stop 99 is mounted in the lower end 101 of the hub.

An axial boss 103 is provided at the lower end of the bowl. A threaded hole 105 extends out through the case while the boss is bored at 107 coaxially with the hole. An adjustable stop has a head 111 adapted to slidably fit in bore 107 and a threaded stem 113 adapted to extend through the hole 105. The head 111 is grooved at 115 to receive an annular seal ring 117 and is, of course, in substantial alignment with the stop 99.

A nut 119 on stem 113 holds the stop 111 in its axially adjusted position. The lower end of the stem has a cylindrical section 121 of reduced diameter terminating in a short threaded portion 123 and a screw driver slot 125. An adjusting wheel 127 is clamped between the large diametered stem 113 and nut 129 screwed on 123.

The periphery of the wheel is provided with grooves 131 at regular intervals of, for instance every 30 degrees, which cooperate with an indicator 133, fixed to the bowl 73 by screw 135, to indicate the setting of the wheel.

This adjustment is provided to permit adjustment in the field where, for example, the user must put additional product in a container to compensate for clingage of the oil to the container. This makes it unnecessary to disturb the calibration of the meter 1.

Sleeves 82 and pistons 93 of different sizes may be inserted in the bore 81 or a piston fitting the bore 81 may be used so that the same bowl and other mechanism may be used with meters of different styles and sizes, without change.

The cover 75 is provided with an upstanding boss 137 in which is rotatably mounted a cam shaft 139 having a pinion 141 connected at the outer end and a face cam 143 at the end which is in the bowl. The pinion has a blank portion 138 which receives a set screw 2. An annular seal 144 is set in groove 146 in the body and seals the shaft. A washer 142 is held in place over the seal by screws 140.

The cam face 145 provides a continuous, uniform rise through 180 degrees of revolution and is disposed to be engaged by the follower 95.

A gear sector 147 is pivotally mounted on a headed pin 149 held in a boss 151, which extends up from cover 75, by means of a set screw 153. The sector meshes with pinion 141.

An arcuate cam slot 155 is formed in the sector. A pair of parallel arms 157, 159 are disposed on opposite sides of the sector and are clamped thereto by a bolt 161 and thumb nut 163. The upper arm 157 is provided with an indicator point 165 which cooperates with a scale 167 on the sector. This scale is shown graduated in coefficients of cubic expansion with three ciphers omitted. It may be graduated in A. P. I. specific gravity degrees, if desired.

The arms 157, 159 are pivotally mounted on a collar 167 at A, which is slidably mounted on the threaded end 171 of a thermostat plunger 173. A pair of nuts 175, one on either side of the collar permit adjustment thereof and hold it once it is adjusted. The center of radius of the arcuate slot 155 is that of the arms from the pivot point A on collar 167, under standard temperature conditions, and as the pointer is moved from low to the high end of the scale, the arm 147 will not pivot. However, if the point A is moved to the right or left of the 60 degrees position, arm 147 will be displaced accordingly and the center of radius of slot 155 will move away from the locus of point A, and movement of the pointer relative to the scale will rotate the lever 147 and gear 141.

Referring now to Figures 1 and 6 particularly, the outlet of meter 1 is connected by a nipple 177 to the thermostat body 179 which has a discharge conduit 178. This body is provided with a tapped opening 181 at one side into which is screwed a bushing 183. The bushing carries a cylindrical housing 185 which is capped at 187.

The housing is filled with liquid which is the operating fluid of the thermostat.

A second bushing 189 is screwed in the first and has a central opening 191 through which the plunger 173 is passed. A pair of counterbores 193, 195 receive an annular rubber seal ring 197 and a holding disc 199 therefor.

A central boss 201 on the second bushing has sealingly fixed to it a metal bellows 203. A guide member 205 is fixed to the free end of the bellows and the plunger 173 is fixed to the piston. A compression spring 207 surrounds the plunger to tend to expand the bellows.

A spring 209 is mounted on the pin 149 and bears on the graduated side of the sector 147 to take up any lost motion, always in the same direction.

*Operation*

It will be assumed that the thermostat body, compensator bowl and meter are assembled in the relation shown in Figure 1, that a source of liquid to be metered is connected to the meter inlet 63 and that the discharge conduit 178 can be opened to start the flow.

The meter 1 has previously been calibrated so that it will deliver less than 231 cubic inches by the amount which will be normally delivered by the compensator at the standard temperature. For instance, assuming that the compensator is to adjust within a range of seven percent of the total output of the meter at 60 degrees F., and that the meter makes one revolution per gallon, the meter will be calibrated by the gearing between it and the register and by raising or lowering the journal 9 so that it will deliver 231 cubic inches minus (.035×231) cubic inches or 223 cubic inches at 60 degrees F. for each gallon registered, plus or minus legal tolerances.

The lower stop 111 of the compensator is set to a predetermined height by a gage and since the cam, cam follower cylinder and piston hub are all held to close tolerances, the rotated position of the cam governs the amount of liquid which will be delivered upon each stroke of the piston. This amount must be the 8 cubic inches which are lacking in the calibration of the meter 1. Since the piston makes a complete reciprocation for each revolution of the valve 51, the amount discharged on each stroke must be ½ of 8 or 4 cubic inches. The setting of the cam at its mid-point will provide the amount of stroke which will permit the piston to displace 4 cubic inches. The connection of the arms 157, 159 with the plunger of the thermostat is adjusted by nuts 175 so as to compensate for variations in the thermostat construction. Thus at the standard temperature, the cam will be at its mid-point and the arcuate slot will be a true circular arc about the pivot point A. The movement of the arms about the pivot A when the thermostat is at 60 degrees F. must produce no motion of the sector since all liquids must have a volume of 231 cubic inches at this temperature.

If the temperature of the thermostat is below 60 degrees, the plunger 173 will rotate sector 147 clockwise and pinion 141 and cam 143 counterclockwise (Figure 1). This brings the cam face 145 closer to the follower 95 and reduces the stroke. Conversely, if the temperature of the thermostat increases above 60 degrees F., the plunger will rotate the sector counter-clockwise and the pinion and cam clockwise which will move the cam face away from the follower to increase the piston stroke.

Thus in the first case, the compensator will add less than 4 cubic inches per stroke to the output of the meter so that when the total output is heated to 60 degrees F. it will occupy 231 cubic inches for each gallon registered.

In the second case, more than 4 cubic inches will be added so that when the combined volume is reduced to 60 degrees F., 231 cubic inches will be displaced for each gallon registered.

The amount subtracted from or added to the 4 cubic inches is varied by the setting of the pointer 165 with respect to the scale 167. Thus where the coefficient of expansion is low the amount of rotation of the sector per unit movement of plunger 173 is less than where the coefficient is high. The setting of the cam is thus altered to increase the amount of displacement of the compensator as the coefficient increases.

It should be understood that the displacement of the meter and compensator are assumed for purposes of illustration and that they explain the principles which would govern the application of the invention to meters having any number of revolutions or even a fractional part of a revolution per registered gallon. In each case, to state the situation simply, it is merely a matter of adding to the liquid displaced by the meter a volume of liquid which will compensate for the expanded or contracted condition of such liquid. This volume is a function of the number of strokes of the compensator piston and the displacement of the compensator piston per stroke.

In view of the above stated principles it will be seen that when the operator has set the pointer 165 to the proper coefficient of cubic expansion figure on the scale 167, he is ready to meter. Opening a control valve (not shown) will cause liquid to flow into inlet 63, channel 65, ports 47 which are opened by valve 51 to the channel so that these pistons will be depressed successively. The valve also connects the rising pistons with the channel 69, case 71, and tube 73 so that measured liquid will flow to the body 179, and to the outlet 178. The liquid in the thermostat will, therefore, be heated or cooled to the temperature of the liquid being measured and will effect adjustment in the cam 143, as described above, as the temperature varies.

As the valve 51 moves in its orbit it first connects port 55 to inlet liquid channel 65 and port 57 to the outlet liquid channel 69. This will force liquid through tube 87, port 85 and chamber 79 of the compensator, thereby forcing the liquid disposed above the piston 93 out through chamber 83, port 88, tube 89, passage 61, port 57 through the valve to the outlet channel 69. As the valve continues in its orbit for 180 degrees, the ports 55 and 57 are connected to the outlet channel 69 and inlet channel 65 respectively so that inlet pressure will be applied to the chamber 83 of the compensator to displace the liquid below the piston into the outlet channel 69. Thus two strokes or one complete cycle of the double action piston 93 is produced for each revolution of the meter.

This liquid added to that displaced by the meter pistons 27, will when reduced to a temperature of 60 degrees F., displace 231 cubic inches, within legal tolerances, for each gallon indicated by the register.

It will be seen that the thermostat body 179 may be placed on the inlet side of the meter if desired, without altering the operation of the device.

In some uses of meters, such as filling containers, it is customary to place a predetermined additional amount of liquid in each container to compensate the purchaser for the amount of product which clings to the container and is discarded therewith. It is usual practice to adjust the displacement of the meter to increase the displacement as by raising the adjusting journal 9. This is somewhat difficult since no indicator is provided to show the amount of the adjustment.

In the instant case, such compensation is easily attained by loosening nut 119 and rotating the hand wheel 127 to lower the stop 111, and re-tightening the nut. The indicator 133 cooperating with grooves 131 on the wheel indicate exactly how much additional product is being added since the notches can be calibrated directly in cubic inches for each size of piston 93.

As stated above, for various styles of meters wherein the displacement per revolution is different, suitable sleeves 82 and pistons 93 can be substituted to secure the proper displacement in the compensator. The bore 81 is determined so that it can be fitted with a piston to handle the maximum displacement required without using a sleeve.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States of America is:

1. In a metering system, the combination of a supply line, a discharge line, a meter in the lines, said meter comprising displacement means and a valve for controlling the operation of the displacement means, a compensator connected to the lines in parallel with the displacement means, control means including said valve for actuating the compensator in time with the meter, said compensator comprising a displacement mechanism, said displacement mechanism being adjustable to vary the displacement thereof, means for controlling the displacement of said mechanism, a temperature responsive means in one line, a lever connected to actuate said controlling means, a member mounted for pivoting about a point on the temperature responsive means, means defining an arcuate slot in said lever and pivot means engaged in and guided in said slot for adjustably connecting said lever to said member.

2. In a metering system, the combination of a supply line, a discharge line, a meter in the lines, said meter comprising displacement means and a valve for controlling the operation of the displacement means, a compensator connected to the lines in parallel with the displacement means, control means including said valve for actuating the compensator in time with the meter, said compensator comprising a displacement mechanism, said displacement mechanism being adjustable to vary the displacement thereof, means for controlling the displacement of said mechanism, a temperature responsive means in one line, a lever connected to actuate said controlling means, a member mounted for pivoting about a point on the temperature responsive means, means defining an arcuate slot in said lever and pivot means engaged in and guided in said slot for adjustably connecting said lever to said member, said slot being in the form of an arc of a circle having as its center the pivot point on said temperature responsive means at the standard temperature.

3. In a metering system, the combination of a supply line, a discharge line, a meter in the lines, said meter comprising displacement means and a valve for controlling the operation of the displacement means, a compensator connected to the lines in parallel with the displacement means, control means including said valve for actuating the compensator in time with the meter, said compensator comprising a displacement mechanism, said displacement mechanism being adjustable to vary the displacement thereof, means for controlling the displacement of said mechanism, a temperature resonsive means in one line, a lever connected to actuate said controlling means, a member mounted for pivoting about a point on the temperature responsive means, means defining an arcuate slot in said lever, pivot means engaged in and guided in said slot for adjustably connecting said lever to said member and means for adjusting the mounting of said member relative to said temperature responsive means.

4. In a metering system, the combination of a supply line, a discharge line, a meter in the lines, said meter comprising displacement means, a compensator connected to the lines in parallel with the displacement means, control means for actuating the compensator in time with the meter, said compensator comprising a displacement mechanism, said displacement mechanism being adjustable to vary the displacement thereof, means for controlling the displacement of said mechanism, a temperature responsive means in one line, a lever connected to actuate said controlling means, a member mounted for pivoting about a point on the temperature responsive means, said member including an indicator, means defining an arcuate slot in said lever, pivot means engaged in and guided in said slot for adjustably connecting said lever to said member, said slot being in the form of an arc of a circle having as its center the pivot point on said temperature responsive means at the standard temperature and there being a scale on said lever cooperating with the indicator on said member to indicate the setting of the member with respect to the lever.

RALPH B. PRESSLER.

References Cited in the file of this patent
UNITED STATES PATENTS

| Number | Name | Date |
|---|---|---|
| 1,854,362 | Zimmerman | Apr. 19, 1932 |
| 1,949,006 | Brubaker | Feb. 27, 1934 |
| 2,066,972 | Granberg | Jan. 5, 1937 |
| 2,095,522 | Hejduk | Oct. 12, 1937 |
| 2,144,748 | Arnold et al. | Jan. 24, 1939 |
| 2,151,201 | Griffith | Mar. 21, 1939 |
| 2,163,794 | McCandless | June 27, 1939 |
| 2,241,132 | Horton | May 6, 1941 |
| 2,286,411 | Hazard | June 16, 1942 |
| 2,487,213 | Bender | Nov. 8, 1949 |
| 2,531,620 | Grise | Nov. 28, 1950 |